(No Model.)
P. H. GENDRON.
SAW FILING MACHINE.
No. 361,757. Patented Apr. 26, 1887.
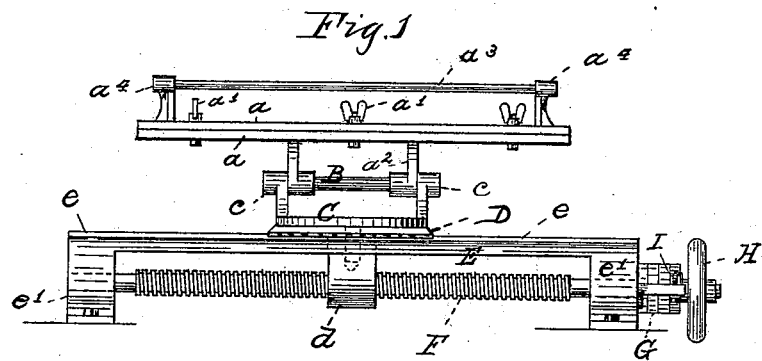
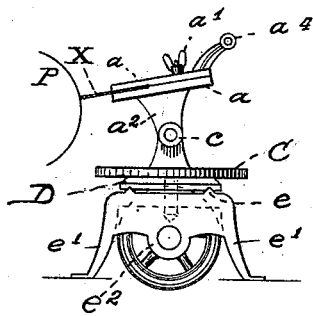
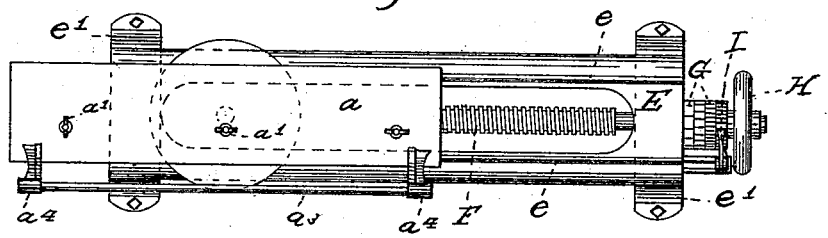
Witnesses
F. A. Merrill
A. M. Johnson
Inventor
P H Gendron
By J. B. Thurston
Attorney

UNITED STATES PATENT OFFICE.

PATRICK H. GENDRON, OF CONCORD, NEW HAMPSHIRE.

SAW-FILING MACHINE.

SPECIFICATION forming part of Letters Patent No. 361,757, dated April 26, 1887.

Application filed September 1, 1886. Serial No. 212,350. (No model.)

*To all whom it may concern:*

Be it known that I, PATRICK H. GENDRON, a citizen of the United States, residing at Concord, in the county of Merrimac and State of New Hampshire, have invented certain new and useful Improvements in Saw-Filing Machines, of which the following is a specification.

The object of this invention is principally to provide a machine capable of filing handsaws, (although it may be used for others to good advantage,) having devices for gaging the various lengths of teeth while being fed across the face of an emery-wheel. These results are attained by the mechanism shown in the accompanying drawings, forming part of this specification, of which—

Figure 1 represents my improved machine in front elevation. Fig. 2 shows an end elevation of the same having the saw-rest tilted down, as when a saw is in contact with the emery-wheel. Fig. 3 is a general plan view having the saw-rest moved to one side in order to more clearly expose the bed-plate.

The saw to be sharpened is placed between the two parts $a\ a$, which, with the thumb-screws $a'$, comprise the saw rest or clamp A. This is pivoted by aid of the arms $a^2$ and the rod or shaft B to bearings $c$, formed upon the swivel-plate C, which is mounted upon a carriage, D, having V-grooves, which receive the V-tongues $e$, running longitudinally upon the top surface of the bed-plate E. This latter may be supported upon legs reaching to the floor, or upon shorter ones, $e'$, adapted to be bolted to a bench or table.

A feed-screw, F, threaded to the projection $d$ of the carriage D, is hung in bearings $e^2$ of the bed-plate. The shaft of said screw projects far enough at one end beyond the said bed-plate to carry a train of ratchet-wheels, G, and a hand-wheel, H, and by turning said hand-wheel motion is imparted to the carriage D endwise of the bed-plate, and by aid of the spring-pawl I, which may be adjusted to engage either of the ratchet-wheels G, this motion of the carriage may be accommodated to the number of teeth a saw may contain to the inch—*i. e.*, the number of teeth on the various ratchet-wheels will vary. Thus the teeth of the first may be such as that by turning the hand-wheel until the spring-pawl has slipped one tooth the screw shall have carried the carriage D one-tenth of an inch, and this would allow ten teeth to the inch on the saw being ground. The next ratchet-wheel may be graduated coarser, so as to cut, say, eight teeth to the inch upon the saw being ground, and so on. As soon as the spring-pawl lets off a tooth of one of the ratchets the clamp A may be tilted by means of the hand-rod $a^3$, mounted in bearings formed in arms $a^4$, extending upward from the upper half of the said clamp, and thus the saw X is placed in contact with the emery-wheel, as seen in Fig. 2, the arc P, shown at the left of this figure, representing a portion of an emery-wheel.

Having described my invention, what I claim, and desire to secure by Letters Patent, is—

1. A saw-rest adapted to clamp the saw, substantially as shown, combined with a swiveled plate to which it is pivoted, a carriage supporting said swiveled plate, and a suitable bed-plate provided with longitudinal tongues fitting corresponding grooves in said carriage, whereby a saw may be tilted down when necessary to bring its teeth against the surface of an emery-wheel, and be passed along successively tooth by tooth while yet secured to the said rest, as set forth.

2. The combination, with the carriage, of a feed-screw provided with ratchet-wheels variously graduated, an adjustable spring-pawl adapted to engage the teeth of either ratchet-wheel, and a suitable hand-wheel for imparting motion to the screw, as and for the purpose specified.

In testimony whereof I affix my signature in presence of two witnesses.

PATRICK H. GENDRON.

Witnesses:
J. B. THURSTON,
NATHANIEL E. MARTIN.